(12) United States Patent
Ohuchi (10) Patent No.: US 9,524,096 B2
(45) Date of Patent: Dec. 20, 2016

(54) ELECTRONIC APPARATUS AND METHOD OF OPERATING ELECTRONIC APPARATUS THROUGH TOUCH SENSOR

(71) Applicant: Rakuten, Inc., Tokyo (JP)

(72) Inventor: Takashi Ohuchi, Kanagawa-ken (JP)

(73) Assignee: RAKUTEN, INC., Tokyo (JP)

( * ) Notice: Subject to any disclaimer, the term of this patent is extended or adjusted under 35 U.S.C. 154(b) by 249 days.

(21) Appl. No.: 14/179,616

(22) Filed: Feb. 13, 2014

(65) Prior Publication Data

US 2014/0165009 A1  Jun. 12, 2014

Related U.S. Application Data

(63) Continuation of application No. 13/683,380, filed on Nov. 21, 2012, now Pat. No. 8,687,103, which is a (Continued)

(30) Foreign Application Priority Data

Jan. 15, 2009  (JP) .................................. 2009-006455

(51) Int. Cl.
*G06F 3/048*  (2013.01)
*H04N 5/232*  (2006.01)
(Continued)

(52) U.S. Cl.
CPC ......... *G06F 3/0488* (2013.01); *G06F 3/03547* (2013.01); *G06F 3/041* (2013.01);
(Continued)

(58) Field of Classification Search
CPC .... G06F 3/0488; G06F 3/03547; G06F 3/041; G06F 3/04815; G06F 3/0482; H04N 5/23216; H04N 5/23293
(Continued)

(56) References Cited

U.S. PATENT DOCUMENTS 5,671,014 A * 9/1997 Ito .......................... H04N 5/232
345/173
5,923,908 A * 7/1999 Schrock ................. G03B 17/38
396/263

(Continued)

FOREIGN PATENT DOCUMENTS

WO  2007/012698 A1  2/2007

*Primary Examiner* — Nhan T Tran
(74) *Attorney, Agent, or Firm* — Hubbs, Enatsky & Inoue PLLC (57) ABSTRACT

An electronic apparatus has a touch sensor provided with a first touching zone including at least a second touching zone and a third touching zone, the second and third touching zones being allocated with different functions. The electronic apparatus is controlled to perform a specific function assigned to a specific touching zone that is the second or the third touching zone when there is a first touch input at first through the specific touching zone and continuously perform the specific function even if there is a second touch input that follows the first touch input, through either the second or the third touching zone that is not the specific touching zone, as long as there is a continuous touch input through the first touching zone from the first to the second touch input with no intermission.

19 Claims, 4 Drawing Sheets

Related U.S. Application Data continuation of application No. 13/668,347, filed on Nov. 5, 2012, now Pat. No. 8,570,425, which is a continuation of application No. 12/655,978, filed on Jan. 12, 2010, now Pat. No. 8,339,499.

(51) Int. Cl.
*G06F 3/0488* (2013.01)
*G06F 3/0354* (2013.01)
*G06F 3/041* (2006.01)
*G06F 3/0481* (2013.01)
*G06F 3/0482* (2013.01)

(52) U.S. Cl.
CPC ........ *G06F 3/0482* (2013.01); *G06F 3/04817* (2013.01); *H04N 5/23216* (2013.01); *H04N 5/23293* (2013.01); *G06F 2203/0339* (2013.01)

(58) Field of Classification Search
USPC .............. 348/333.01, 333.02, 333.12, 14.03, 348/207.99; 345/173
See application file for complete search history.

(56) References Cited

U.S. PATENT DOCUMENTS

| | | | |
|---|---|---|---|
| 6,597,400 B2* | 7/2003 | Nishimura | H04N 5/23293 348/333.02 |
| 6,778,217 B1* | 8/2004 | Nishimura | H04N 5/23293 348/333.02 |
| 7,088,343 B2* | 8/2006 | Smith | G06F 3/03547 345/173 |
| 7,619,677 B2* | 11/2009 | Matsuda | G06F 3/04886 348/333.01 |
| 7,649,562 B2* | 1/2010 | Misawa | G06F 3/04847 345/173 |
| 8,214,761 B2* | 7/2012 | Sasaki | H04N 5/23293 715/811 |
| 2006/0238625 A1* | 10/2006 | Sasaki | H04N 5/23293 348/231.3 |
| 2014/0165008 A1 | 6/2014 | Ohuchi | |

* cited by examiner

ELECTRONIC APPARATUS AND METHOD OF OPERATING ELECTRONIC APPARATUS THROUGH TOUCH SENSOR

CROSS-REFERENCE TO RELATED APPLICATIONS

This application is a continuation of U.S. patent application Ser. No. 13/683,380 filed Nov. 21, 2012, which is a continuation of U.S. patent application Ser. No. 13/668,347, filed Nov. 5, 2012, now U.S. Pat. No. 8,570,425, which is a continuation of U.S. patent application Ser. No. 12/655,978, filed Jan. 12, 2010, now U.S. Pat. No. 8,339,499, which was based on and claims the benefit of priority from the prior Japanese Patent Application No. 2009-006455 filed on Jan. 15, 2009, the entire contents of which is incorporated herein by reference.

BACKGROUND OF THE INVENTION

The present invention relates to an electronic apparatus equipped with a touch sensor and a method of operating an electronic apparatus through a touch sensor.

One type of electronic apparatus widely spread is an electronic apparatus that is operated through a touch sensor.

An advantage of an electronic apparatus equipped with a touch sensor or a method of operating an electronic apparatus through a touch sensor is that several functions can be allocated to several zones of the sensing area of the touch sensor.

Nevertheless, a touch sensor could cause misoperation of such an electronic apparatus due to user's unintentional touch of an undesired zone of the sensing area of the touch sensor.

One method of preventing such misoperation of an electronic apparatus through a touch sensor is disclosed in Japanese Un-examined Patent Publication No. 11 (1999)-175212. Provided on a touch panel are a first zone for selecting a button and a second zone larger than the first zone and provided as surrounding the first zone. Both zones are provided for each button on the touch panel. Once a user touches the first zone, the button selected through this first zone is continuously selected as long as the user's finger is located within the second zone.

The misoperation prevention method described above is, however, disadvantageous in use of an imaging apparatus equipped with a touch-panel sensor, particularly, when a user operates the imaging apparatus while he or she is watching a target object or an image of the target on a monitor screen without watching the touch-panel sensor. It could happen that the user unintentionally shifts his or her finger from a touched zone to another undesired zone on the touch-panel sensor (from the first zone to another zone beyond the second zone in the misoperation prevention method described above) while touching the touch-panel sensor to operate the imaging apparatus. Such an unintentional finger shift causes un-intentional operation or misoperation of the imaging apparatus.

SUMMARY OF THE INVENTION

A purpose of the present invention is to provide an electronic apparatus equipped with a touch sensor and a method of operating an electronic apparatus through a touch sensor, preventing misoperation of the electronic apparatus even if a user unintentionally shifts his or her finger from a touched zone to another zone on a touch panel of the touch sensor while he or she is intentionally touching the former zone to operate the electronic apparatus.

The present invention provides an electronic apparatus comprising: a touch sensor provided with a first touching zone that includes at least a second touching zone and a third touching zone, the second and third touching zones being allocated with different functions; at least one functional component to perform a specific function assigned to a specific touching zone that is the second or the third touching zone; a controller to receive a touch input through the first touching zone and control the functional component so that the functional component performs the specific function when there is a first touch input at first through the specific touching zone and the functional component continuously performs the specific function even if there is a second touch input that follows the first touch input, through either the second or the third touching zone that is not the specific touching zone, as long as there is a continuous touch input through the first touching zone from the first to the second touch input with no intermission.

Moreover, the present invention provides a method of controlling an electronic apparatus through a touch sensor provided with a first touching zone that includes at least a second touching zone and a third touching zone, the second and third touching zones being allocated with different functions to be performed by the electronic apparatus, the method comprising the steps of: determining whether there is a first touch input at first through a specific touching zone that is the second or the third touching zone of the touch sensor; controlling the electronic apparatus to perform a specific function assigned to the specific touching zone when it is determined that there is the first touch input at first through the specific touching zone; determining whether there is a second touch input that follows the first touch input through either the second or the third touching zone that is not the specific touching zone; and controlling the electronic apparatus to continuously perform the specific function even if it is determined that there is the second touch input, as long as there is a continuous touch input through the first touching zone from the first to the second touch input with no intermission.

DETAILED DESCRIPTION OF PREFERRED EMBODIMENT

A preferred embodiment according to the present invention will be disclosed with reference to the drawings attached herewith.

Figure 1:
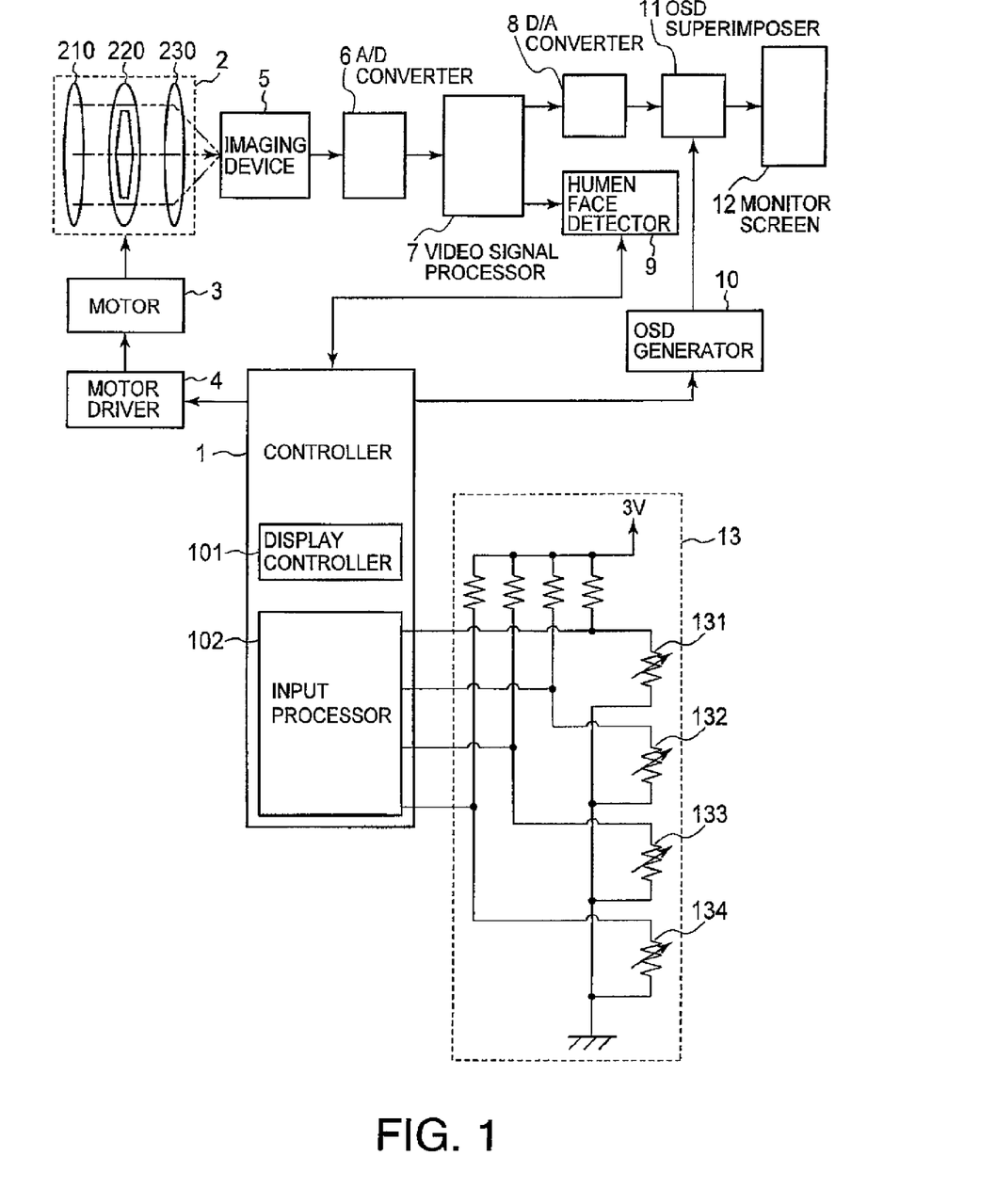
FIG. 1 shows a block diagram of an imaging apparatus, a preferred embodiment of electronic apparatus according to the present invention.

Described with reference to a block diagram of FIG. 1 is an imaging apparatus, a preferred embodiment of electronic apparatus according to the present invention.

In FIG. 1, light from a target object (not shown) is captured by lenses 210 and 230 of an optical unit 2. The optical unit 2 is equipped with an aperture 220 between the lenses 210 and 230. Although, only two lenses 210 and 230 are shown for brevity, the optical unit 2 is, generally, equipped with multiple lenses.

The light is incident on an imaging device 5, such as CCD, to be converted into electric pixel signals which are then supplied to an A/D converter 6. The pixel signals are converted into digital pixel signals by the A/D converter 6 and supplied to a video signal processor 7.

On receiving the pixel signals, the video signal processor 7 generates video signals, such as RGB signals, based on the pixel signals, with specific signal processing. The video signals that have been applied the specific signal processing are then supplied to a D/A converter 8 and a human face detector 9.

The D/A converter 8 converts the video signals into analog video signals and supplies them to an OSD (On Screen Display) superimposer 11.

The human face detector 9 detects a skin color portion in an image carried by the video signals and also detects one or more human faces contained in the image which can be done with a known pattern recognition technique. Then, the detector 9 supplies face detection information to a controller 1.

The controller 1, which may be configured by a single or a plural number of microprocessors, includes a display controller 101 and an input processor 102.

Connected to the input processor 102 is a touch-panel sensor 13 which may be a capacitive touch-panel sensor. When there is a user input, the touch-panel sensor 13 outputs operational information carried by the user input to the input processor 102 that applies a specific process to the operational information, as described later.

The display controller 101 controls an OSD generator 10 in accordance with the operational information processed by the input processor 102.

The OSD generator 10 generates an OSD signal under control by the display controller 101 and supplies the OSD signal to the OSD superimposer 11.

The OSD superimposer 11 superimposes the OSD signal on the video signals supplied from the D/A converter 8. The video signals superimposed with the OSD signal are then displayed on a monitor screen 12.

The controller 1 outputs control signals for driving a motor 3 to a motor driver 4 in accordance with the face detection information and/or the operational information supplied from the human face detector 9 and the touch-panel sensor 13, respectively.

In response to the control signals, the motor driver 4 drives the motor 3 to shift the lenses 210 and 230 and/or adjust the aperture 220 of the optical unit 2 so that the optical unit 2 can make focusing, zooming and exposure adjustments.

Accordingly, the optical unit 2, the motor 3 and the motor driver constitute a zooming functional component. Although the embodiment employs such an optical zooming functional component, the invention can employ an electrical or opto-electrical zooming functional component.

The imaging apparatus, an embodiment of electronic apparatus according to the present invention, will further be described with reference to FIG. 1 and also FIGS. 2A and 2B.

Figure 2A:
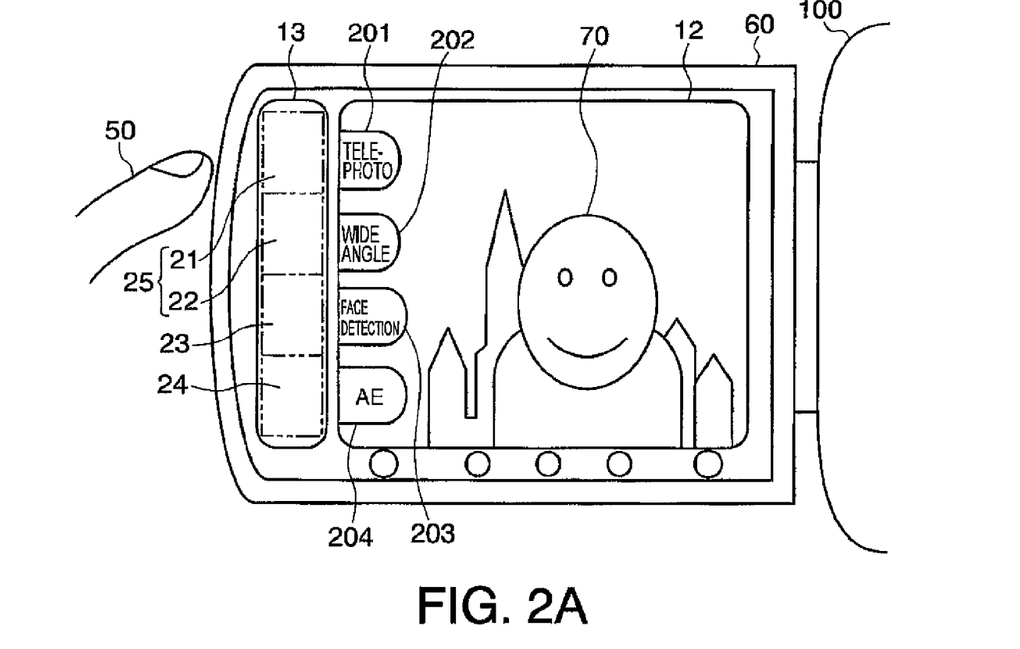
FIGS. 2A and 2B illustrate operations of the imaging apparatus according to the present invention, through a touch-panel sensor.
Figure 2B:
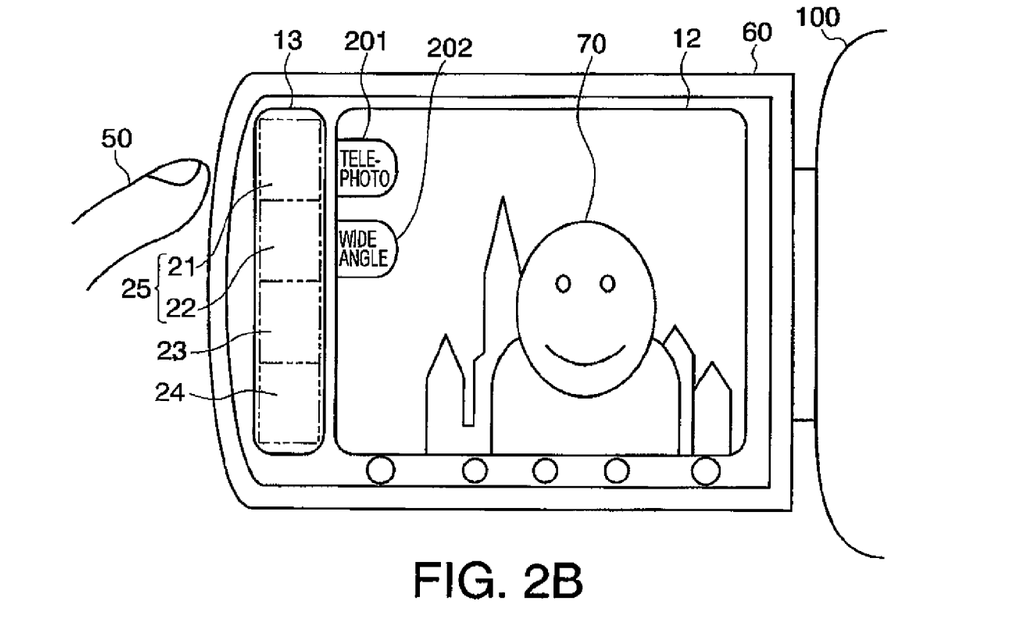

Shown in FIGS. 2A and 2B are a hinged monitor 60 and a housing 100 of the imaging apparatus.

Provided on the monitor 60 are the monitor screen 12 and the touch-panel sensor 13 in the vicinity of the monitor screen 12. The components other than the monitor screen 12 and the touch-panel sensor 13 are installed in the housing 100.

In this embodiment, the touch-panel sensor 13 has four touching zones 21 to 24, as indicated by double-dashed dotted lines, corresponding to variable resisters 131 to 134, respectively, shown in FIG. 1.

When a user touches any of the zones 21 to 24 with his or her finger 50, the corresponding variable resister among the resisters 131 to 134 varies its resistance due to change in electric charges stored in a capacitor (not shown) to vary a voltage developed thereacross.

The input processor 102 (FIG. 1) detects the change in voltage occurred across any of the variable resisters 131 to 134 to determine which of the zones 21 to 24 is touched by the user with the finger 50.

The monitor screen 12 displays an image 70 (a human) of the target object and also OSD guide images 201 to 204 along the touching zones 21 to 24, respectively. The touching zones 21 to 24 are allocated with functions of the imaging apparatus (an embodiment of electronic apparatus of the present invention). The guide images 201 to 204 indicate those functions allocated to the touching zones 21 to 24, respectively, with words (such as shown in FIG. 2A) meaning the functions, which may optionally be icons.

In this embodiment, the function allocated to a touching zone 25 that includes the touching zones 21 and 22 is a zooming function. Moreover, allocated to the touching zones 21 and 22 are sub-functions of the zooming function, telephoto and wide-angle zooming functions, respectively. Allocated to the touching zones 23 and 24 are a human-face detecting function and an automatic exposure (AE) function, respectively.

The number of touching zones on the touch-panel sensor 13 and the types of function to be allocated to the touching zones depend on what electronic apparatus is employed within the scope of the present invention.

Suppose that the user touches the touching zone 21 (telephoto) with his or her finger 50 at first. The touch causes the change in voltage developed across the variable resister 131 that corresponds to the touching zone 21. The input processor 102 of the controller 1 then detects the change in voltage to determine that the zone 21 is touched by the finger 50.

Then, the controller 1 sends a control signal for the telephoto zooming function to the motor driver 4. In response to the control signal, the motor driver 4 drives the motor 3 to shift the lenses 210 and 230 to vary the zoom magnification by specific times to the telephoto side.

The controller 1 continuously outputs the control signal for the telephoto zooming function as long as the zone 21 is being touched by the finger 50, which makes the zoom magnification larger towards the maximum magnification at a specific speed.

Suppose that the user touches the zone 22 (wide angle) with his or her finger 50 at first. The touch causes the change in voltage developed across the variable resister 132 that corresponds to the zone 22. The input processor 102 of the controller 1 then detects the change in voltage to determine that the zone 22 is touched by the finger 50.

Then, the controller 1 sends a control signal for the wide-angle zooming function to the motor driver 4. In response to the control signal, the motor driver 4 drives the motor 3 to shift the lenses 210 and 230 to vary the zoom magnification by specific times to the wide-angle side.

The controller 1 continuously outputs the control signal for the wide-angle zooming function as long as the zone 22 is being touched by the finger 50, which makes the zoom magnification smaller towards the minimum magnification at a specific speed.

Suppose that the user touches the zone 23 (human-face detection) with his or her finger 50 at first. The touch causes the change in voltage developed across the variable resister 133 that corresponds to the zone 23. The input processor 102 of the controller 1 then detects the change in voltage to determine that the zone 23 is touched by the finger 50.

Then, the controller 1 commands the human-face detector 9 to start the human-face detecting function. The human face detector 9 detects a skin color portion in an image carried by the video signals sent from the video signal processor 7 and also detects the face of the human 70. Then, the detector 9 supplies the face detection information to the controller 1.

Then, the controller 1 sends a control signal for focusing on the detected human face to the motor driver 4. In response to the control signal, the motor driver 4 drives the motor 3 to shift the lenses 210 and 230 to focus on the detected human face.

When the user touches the zone 23 again with his or her finger 50, the controller 1 commands the human-face detector 9 to halt the human-face detecting function.

Suppose that the user touches the zone 24 (AE) with his or her finger 50 at first. The touch causes the change in voltage developed across the variable resister 134 that corresponds to the zone 24. The input processor 102 of the controller 1 then detects the change in voltage to determine that the zone 24 is touched by the finger 50.

Then, the controller 1 sends a control signal to the motor driver 4 to adjust the aperture 220 of the optical unit 2 for exposure adjustments in accordance with the environments of the target object. In response to the control signal from the controller 1, the motor driver 4 drives the motor 3 to adjust the aperture 220 for exposure adjustments.

Figure 3:
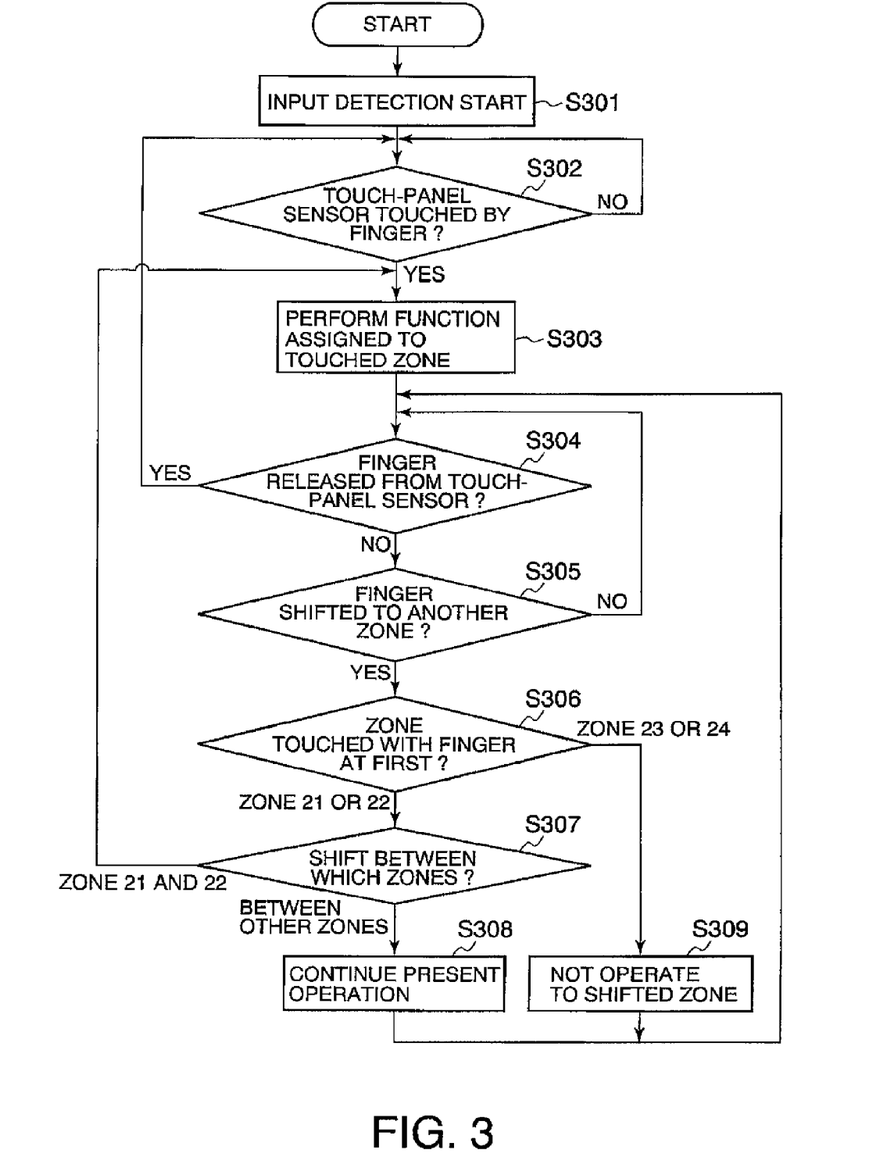
FIG. 3 shows a flow chart explaining an operation of the imaging apparatus according to the present invention, through the touch-panel sensor.

Described next with reference to FIG. 2A and a flowchart shown in FIG. 3 is an operation of the imaging apparatus (FIG. 1), the embodiment of electronic apparatus according to the present invention, in the case where a user intentionally or unintentionally touches the touch-panel sensor 13.

When the imaging apparatus is powered on, the input processor 102 of the controller 1 starts a touch-sensor input detection process in step S301.

The input processor 102 determines whether any of the touching zones 23, 24 and 25 of the touch-panel sensor 13 is touched by the user with his or her finger 50 in step S302. If any of the zones 23 to 25 is not touched by the finger 50 (NO in step S302), the input processor 102 continues the input detection process. On the contrary, if it is determined that one of the zones 23 to 25 is touched by the finger 50 at first, or there is a first touch input (YES in step S302), the process goes to step S303.

In step S303, the input processor 102 stores zone data indicating the touched zone 23, 24 or 25 in a memory (not shown) that may be installed in the controller 1 or another component of the imaging apparatus. The memory is updated when it has already stored zone data.

Moreover, in step S303, the controller 1 controls the operation of the imaging apparatus in accordance with the function assigned to the touched zone, as described below.

When the zone 21 in the zone 25 is determined as being touched by the finger 50, the controller 1 performs a control procedure to change the zoom magnification to the telephoto side. On the contrary, when the zone 22 in the zone 25 is determined as being touched by the finger 50, the controller 1 performs a control procedure to change the zoom magnification to the wide-angle side.

However, if it is the zone 23 that is determined as being touched by the finger 50 and if the human-face detection function is off at present, the controller 1 starts the human-face detection. Contrary to this, if it is the zone 23 that is determined as being touched by the finger 50 and if the human-face detection function is on at present, the controller 1 halts the human-face detection.

Moreover, if it is the zone 24 that is determined as being touched by the finger 50 and if the automatic exposure adjustments function is off at present, the controller 1 starts the automatic exposure adjustments, Contrary to this, if it is the zone 24 that is determined as being touched by the finger 50 and if the automatic exposure adjustments function is on at present, the controller 1 halts the human-face detection.

Next, in step S304, the input processor 102 determines whether the user has released his or her finger 50 from the touch-panel sensor 13. The process returns to step S302 if it is determined that the user has released his or her finger 50 from the touch-panel sensor 13 (YES in Step S304). On the contrary, the process moves to step S305 if it is determined that the user has not released his or her finger 50 from the touch-panel sensor 13 (NO in Step S304).

In step S305, the input processor 102 determines whether the user has shifted his or her finger 50 from the particular zone that was touched by the finger 50 at first (the first touch input) to another zone (a second touch input) on the touch-panel sensor 13, without releasing the finger 50 from the touch-panel sensor 13. The process returns to step S304 if it is determined that the user has not shifted his or her finger 50 from the particular zone of the touch-panel sensor 13 (NO in Step S305). On the contrary, the process moves to step S306 if it is determined that the user has shifted his or her finger 50 from the particular zone of the touch-panel sensor 13 (YES in Step S305).

In step S306, the input processor 102 accesses the zone data in the memory to determine which of the zones 21 to 24 of the touch-panel sensor 13 was touched by the user with his or her finger 50 at first.

The process moves to step S307 if it is the zone 21 or 22 that was touched by the finger 50 at first. On the contrary, the process moves to step S309 if it is the zone 23 or 24 that was touched by the finger 50 at first.

In step S309, the input processor 102 replaces the operational information input through the touch-panel sensor 13 from the information corresponding to the zone to which the user has shifted his or her finger 50 to the information corresponding to the zone 23 or 24 the user touched his or her finger 50 at first. Then, the controller 1 controls the operation of the imaging apparatus in accordance with the operational information corresponding to the zone 23 or 24 even if the user has shifted his or her finger 50 to another zone, or the controller 1 controls the operation of the imaging apparatus so that the imaging apparatus does not operate in accordance with the operational information corresponding to the zone to which the user has shifted his or her finger 50. The process then returns to step S304.

On the contrary, in step S307, that follows step S306, when it is determined that the zone 21 or 22 was touched by the user with his or her finger 50 at first, the input processor 102 determines from which zone to another on the touch panel 13 the user has shifted his or her finger 50.

If it is determined that the user has shifted his or her finger 50 from the zone 21 to the zone 22, or vice versa, the process returns to step S303 in which the controller 1 controls the operation of the imaging apparatus in accordance with the zone 21 or 22 the user touches at present.

If it is determined that the user has shifted his or her finger 50 from the touching zone 21 or 22 to another zone on the touch-panel sensor 13, the process moves to step S308 in which the input processor 102 replaces the operational information input through the touch-panel sensor 13 from the information corresponding to the zone to which the user has shifted his or her finger 50 to the information corresponding to the zone 21 or 22 the user touched with his or her finger 50 at first. Then, the controller 1 controls the operation of the imaging apparatus in accordance with the operational information corresponding to the zone 21 or 22 the user touched with his or her finger 50 at first, or the controller 1 controls the operation of the imaging apparatus so that the imaging apparatus continuously operates in accordance with the zone the user touched with his or her finger 50 at first. Then, the process returns to step S304.

The finger shift from the touching zone 21 or 22 to another zone in step S307 includes the shift, such as: from the zone 22 to the zone 23; from the zone 21 to the zone 22 via the zone 23; from the zone 22 to the zone 23, then to the zone 24; and from the zone 22 to the zone 24, then to the zone 23.

Accordingly, there are several features in the imaging apparatus, the embodiment of electronic apparatus of the present invention, as summarized below.

When the user touches the zone 21 or 22 of the touch-panel sensor 13 for the zooming function with his or her finger 50 at first, the imaging apparatus continuously performs the zooming function as long as the user is touching the touch-panel sensor 13 even if he or she shifts his or her finger 50 from the zone 21 or 22 to the zone 23 or 24 that is not related to the zooming function.

Not only that, when the user touches the zone 21 (or 22) of the touch panel 13 for the zooming function with his or her finger 50 at first and then shifts the finger 50 from the zone 21 (or 22) to the zone 22 (or 21) also for the zooming function, the imaging apparatus operates in accordance with the operational information input from the zone 22 (or 21) touched by the user at present, not the zone 21 (or 22) touched at first.

Moreover, when the user touches the zone 23 (face detection) or 24 (automatic exposure) of the touch panel 13 with his or her finger 50 at first, the imaging apparatus performs the face detection or automatic exposure function as long as the user is touching the touch panel 13 even if he or she shifts the finger 50 from the zone 23 or 24 to another zone, thus misoperation being avoided.

Furthermore, in FIG. 3, when it is determined that the zone 21 or 22 is touched by the user with his or her finger 50 at first (YES in step S302), the display controller 101 of the controller 1 (FIG. 1) may erase the OSD guide images 203 and 204 from the touch-panel sensor 13, as shown in FIG. 2B, in step S303.

Figure 4A:
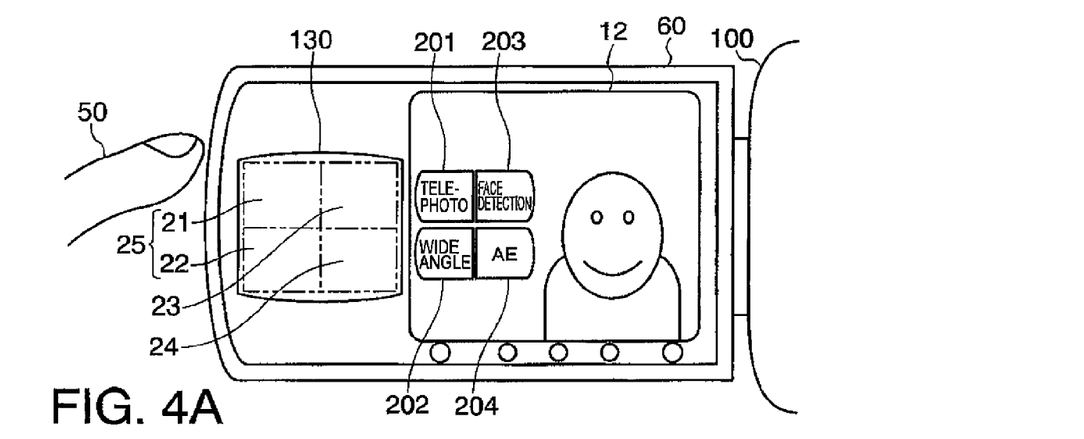
FIGS. 4A to 4C illustrate a variation of the imaging apparatus according to the present invention.
Figure 4B:
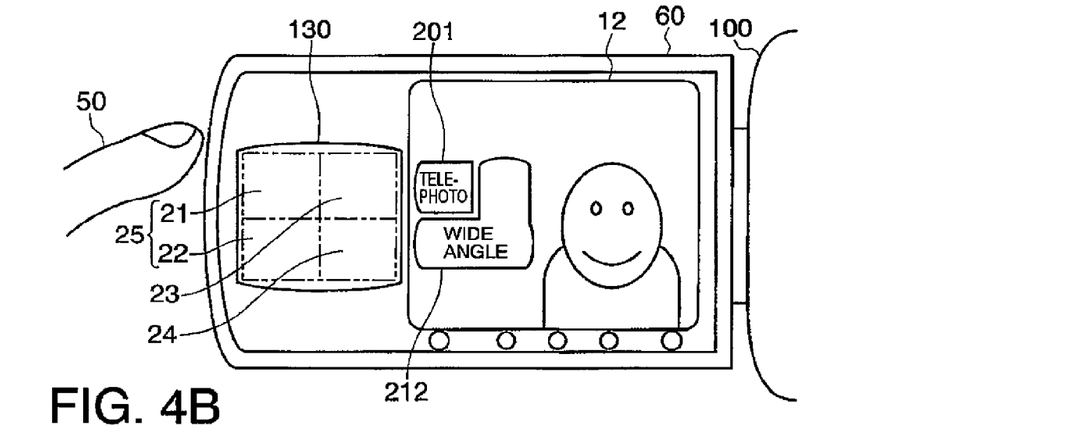
Figure 4C:
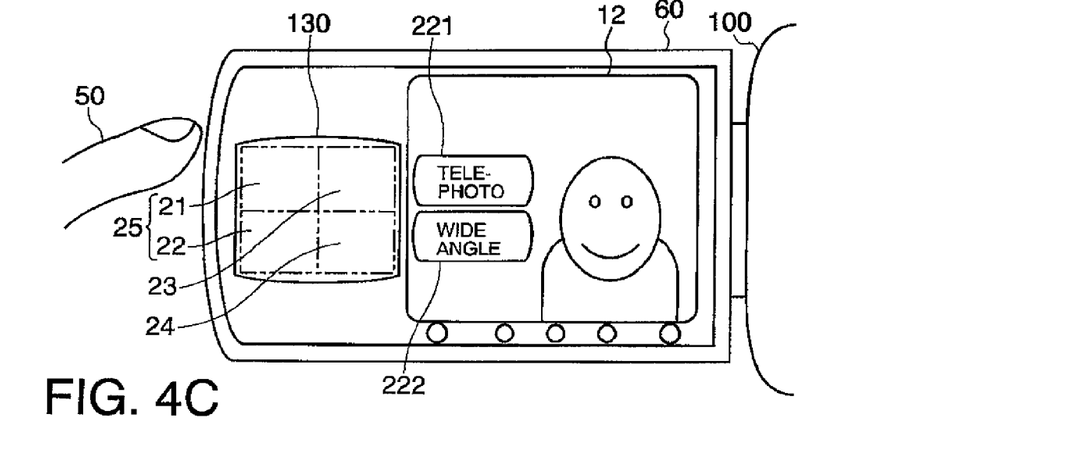

Described further with respect to FIGS. 4A to 4C is a variation of the imaging apparatus, the embodiment of electronic apparatus of the present invention.

As shown in FIG. 4A, the variation of the imaging apparatus is equipped with a touch-panel sensor 130 with the touching zones 21 to 24, the same as those shown in FIG. 2A, but arranged in a 2×2 matrix.

Displayed on the monitor screen 12 are the OSD guide images 201 to 204, the same as those shown in FIG. 2A, but arranged in a 2×2 matrix, matched with the arrangements of the touching zones 21 to 24.

The circuit configuration and the operations and functions related to the touching zones 21 to 24 on the touch-panel sensor 130 in the variation are the same as those of the embodiment described with respect to FIGS. 1 to 3.

In the variation, when the zone on the touch-panel sensor 130 touched at first by the user with his or her finger 50 is the zone 22 (wide angle), the display controller 101 of the controller 1 (FIG. 1) may display a wide OSD guide image 212, such as shown in FIG. 4B, instead of the guide image 202 shown in FIG. 4A, while erasing the guide images 203 and 204.

Moreover, in the variation, when the zone on the touch-panel sensor 130 touched at first by the user with his or her finger 50 is the zone 21 or 22, the display controller 101 of the controller 1 may display wide OSD guide images 221 and 222, such as shown in FIG. 4C, instead of the guide images 201 and 202 shown in FIG. 4A, while erasing the guide images 203 and 204.

It is further understood by those skilled in the art that the foregoing descriptions are a preferred embodiment and a variation of the disclosed apparatus and that various changes and modifications may be made in the invention without departing from the sprit and scope of thereof.

For example, a transparent touch-panel sensor may be provided on the monitor screen 12 in FIGS. 2A and 4A. The touch-panel sensor may be touched by a tool, such as a pen, instead of a finger.

Moreover, the components of the imaging apparatus shown in FIG. 1 may be separately controlled by several controllers instead of the single controller 1.

As disclosed above, in detail, the present invention provides an electronic apparatus equipped with a touch sensor and a method of operating an electronic apparatus through a touch sensor, preventing misoperation of the electronic apparatus even if a user unintentionally shifts his or her finger from a touched zone to another zone on a touch panel of the touch sensor while he or she is intentionally touching the former zone to operate the electronic apparatus.

What is claimed is:

1. An electronic apparatus comprising:
   a touch sensor;
   a controller to perform;
   a process of controlling a first operation so as to be performed in response to a first action that is carried out while a touched state of the touch sensor is maintained after a first zone of the touch sensor is touched after an untouched state of the touch sensor;
   a process of controlling a second operation so as to be performed in response to a second action that is carried out due to a second zone of the touch sensor being touched after an untouched state of the touch sensor and the second zone of the touch sensor being touched again after an untouched state of the touch sensor;
   a display section to display a first image corresponding to the first action and a second image corresponding to the second action;
   wherein, while the display section is displaying the image corresponding to the first action and the image corresponding to the second action, the controller controls the display section so as erase the second image corresponding to the second action due to the first zone being touched after an untouched state of the touch sensor.

2. The electronic apparatus according to claim 1, wherein a plurality of images include the first image and the second image,
   while the display section is displaying the plurality of images, the controller controls the display section so as to erase the second image and display a third image in an area that is at least partially overlapped with an area in which the second image used to he displayed in the untouched state, due to the first zone being touched after an untouched state of the touch sensor.

3. The electronic apparatus according to claim 2, wherein, while the display section is displaying the plurality of images, the controller controls the display section so as to erase the second image without erasing the first image due to the first zone being touched after an untouched state of the touch sensor.

4. The electronic apparatus according to claim 2, wherein, while the display section is displaying the plurality of images, the controller controls the display section so as to erase the first and second images due to the first zone being touched after an untouched state of the touch sensor.

5. The electronic apparatus according to claim 2, wherein the first operation is related to a first function and the third image is related to the first function.

6. The electronic apparatus according to claim 2, wherein the first operation is related to a first function and the first image is related to the first function.

7. The electronic apparatus according to claim 2, wherein the second image is not related to the first operation.

8. The electronic apparatus according to claim 2, wherein the second image is related to the second operation.

9. The electronic apparatus according to claim 1, wherein he first operation is to vary a value related to a first function to a larger value or a smaller value.

10. The electronic apparatus according to claim 5, wherein the electronic apparatus is an imaging apparatus having a zooming function and the first function is the zooming function.

11. The electronic apparatus according to claim 1, wherein the second operation is to change a mode of a function from a turn-on mode to a turn-off mode or from the turn-off mode to the turn-on mode.

12. The electronic apparatus according to claim 1, wherein the electronic apparatus is an imaging apparatus and the second operation is to change a mode of a face detecting function from a turn-on mode to a turn-off mode or from the turn-off mode to the turn-on mode.

13. The electronic apparatus according to claim 1, wherein the electronic apparatus is an imaging apparatus and the second operation is to change a mode of an automatic exposure adjustments function from a turn-on mode to a turn-off mode or from the turn-off mode to the turn-on mode.

14. The electronic apparatus according to claim 1, wherein the image is a letter or an icon.

15. The electronic apparatus according to claim 1, wherein the display section includes a monitor screen and the touch sensor is provided in a manner that the touch sensor is separated from the monitor screen.

16. The electronic apparatus according to claim 1, wherein the display section includes a monitor screen and the touch sensor is provided in a manner that the touch sensor is overlapped with the monitor screen.

17. The electronic apparatus according to claim 1, wherein the touch sensor is transparent.

18. A method of controlling at electronic apparatus equipped with a touch sensor and a display section, comprising the steps of:
controlling a first operation so as to be performed in response to a first action that is carried out while a touched state of the touch sensor is maintained after a first zone of the touch sensor is touched after an untouched state of the touch sensor;
controlling a second operation so as to be performed in response to a second action that is carried out due to a second zone of the touch sensor being touched after an untouched state of the touch sensor and the second zone of the touch sensor being touched again after an untouched state of the touch sensor;
while the display section is displaying an image corresponding to the first action and a second image corresponding to the second action, controlling the display section so as to erase the second image corresponding to the second action due to the first zone being touched after an untouched state of the touch sensor.

19. A non-transitory computer readable storage medium having stored therein instructions, which when executed by an electronic apparatus equipped with a touch sensor and a display section, cause the electronic apparatus to:
control a first operation so as to be performed in response to a first action that is carried out while a touched state of the touch sensor is maintained after a first zone of the touch sensor is touched after an untouched state of the touch sensor;
control a second operation so as to be performed in response to a second action that is carried out due to a second zone of the touch sensor being touched after an untouched state of the touch sensor and the second zone of the touch sensor being touched again after an untouched state of the touch sensor; and
while the display section is displaying an image corresponding to the first action and a second image corresponding to the second action, control the display section so as to erase the second image corresponding to the second action due to the first zone being touched after an untouched state of the touch sensor.

* * * * *